(12) United States Patent
Tohta

(10) Patent No.: US 10,415,699 B2
(45) Date of Patent: Sep. 17, 2019

(54) VEHICLE LOCK-UP CONTROL METHOD AND CONTROL DEVICE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/763,352

(22) PCT Filed: Oct. 23, 2015

(86) PCT No.: PCT/JP2015/079978
§ 371 (c)(1),
(2) Date: Mar. 26, 2018

(87) PCT Pub. No.: WO2017/068718
PCT Pub. Date: Apr. 27, 2017

(65) Prior Publication Data
US 2018/0266549 A1    Sep. 20, 2018

(51) Int. Cl.
*F16H 61/14* (2006.01)
*F16H 45/02* (2006.01)
(Continued)

(52) U.S. Cl.
CPC .......... *F16H 61/143* (2013.01); *B60W 10/026* (2013.01); *B60W 10/30* (2013.01);
(Continued)

(58) Field of Classification Search
CPC .. F16H 61/143; F16H 45/02; F16H 2059/145; F16H 2059/186; B60W 10/30;
(Continued)

(56) References Cited

U.S. PATENT DOCUMENTS

2005/0261112 A1   11/2005  Kiuchi
2012/0184405 A1    7/2012  Morimura et al.
(Continued)

FOREIGN PATENT DOCUMENTS

CN    1769745 A    5/2006
JP    8-233097 A   9/1996
(Continued)

*Primary Examiner* — Stacey A Fluhart
(74) *Attorney, Agent, or Firm* — Global IP Counselors, LLP

(57) ABSTRACT

A vehicle includes an engine, a continuously variable transmission and a torque converter that has a lock-up clutch. The torque converter is arranged between the engine and the continuously variable transmission. The vehicle further includes engine accessories such as an air conditioner compressor and alternator that are driven by the engine. In this vehicle, a slip control is executed that produces a predetermined slip rotational state by controlling a lock-up capacity of the lock-up clutch. During slip control of the lock-up clutch, the engine-equipped vehicle executes cooperative control that suppresses load fluctuations of engine accessories such as the air conditioner compressor and the alternator.

4 Claims, 6 Drawing Sheets

(51) Int. Cl.
  *B60W 10/02* (2006.01)
  *B60W 10/30* (2006.01)
  *F16H 59/14* (2006.01)
  *F16H 59/48* (2006.01)
  *F16H 59/18* (2006.01)
(52) U.S. Cl.
  CPC ....... *F16H 45/02* (2013.01); *B60W 2510/305* (2013.01); *B60W 2710/305* (2013.01); *F16H 59/48* (2013.01); *F16H 2045/0273* (2013.01); *F16H 2059/145* (2013.01); *F16H 2059/186* (2013.01)
(58) Field of Classification Search
  CPC ..... B60W 2510/305; B60W 2710/305; B60W 10/026
  See application file for complete search history.

(56) References Cited

U.S. PATENT DOCUMENTS

| | | | |
|---|---|---|---|
| 2015/0308521 A1* | 10/2015 | Smith | F16D 48/06 |
| | | | 701/68 |
| 2017/0204968 A1* | 7/2017 | Honma | F16H 59/18 |

FOREIGN PATENT DOCUMENTS

| | | |
|---|---|---|
| JP | 9-53718 A | 2/1997 |
| JP | 2003-65433 A | 3/2003 |
| JP | 2004-138147 A | 5/2004 |
| JP | 2004-347004 A | 12/2004 |
| JP | 2012-57670 A | 3/2012 |

\* cited by examiner

VEHICLE LOCK-UP CONTROL METHOD AND CONTROL DEVICE

CROSS-REFERENCE TO RELATED APPLICATIONS

This application is a U.S. National stage application of International Application No. PCT/JP2015/079978, filed on Oct. 23, 2015.

BACKGROUND

Field of the Invention

The present invention relates to a vehicle lock-up control method and control device that carries out a slip control to produce a predetermined slip rotational state by using a lock-up capacity control of a lock-up clutch.

Background Information

Conventionally, an engagement force control device for a lock-up clutch is known in which a torque converter disposed between an engine and a transmission and having a lock-up clutch is provided, and a lock-up control is carried out in which the lock-up clutch is slip controlled. In this lock-up control, lock-up capacity is gradually increased and slip rotational speed is decreased to thereby shift the lock-up clutch from a released state to an engaged state (for example, refer to Japanese Laid Open Patent Application No. 2004-138147—Patent Document 1).

SUMMARY

However, in the conventional device, when there are load fluctuations of engine accessories such as an air conditioner compressor and an alternator during slip control of the lock-up control, the engine torque that is input to the lock-up clutch fluctuates. Consequently, a problem occurs in which a predetermined slip rotational state that is scheduled in the slip control of the lock-up clutch deteriorates, and the slip control cannot achieve its targeted objective.

In view of the problems described above, an object of the present invention is to provide a vehicle lock-up control method and control device that prevent a slip rotational state from deteriorating as a result of load fluctuations of engine accessories during slip control of a lock-up clutch.

In order to achieve the object described above, the present invention comprises a torque converter that has a lock-up clutch and that is disposed between an engine and a transmission, and engine accessories that are driven by the engine. In this vehicle, slip control that produces a predetermined slip rotational state is carried out by using a lock-up capacity control of the lock-up clutch. During slip control of the lock-up clutch, a cooperative control that suppresses load fluctuations of engine accessories is carried out.

Therefore, a cooperative control that suppresses load fluctuations of engine accessories is carried out during slip control of the lock-up clutch. That is, when there are load fluctuations of engine accessories during slip control of the lock-up clutch, the engine torque that is input to the lock-up clutch fluctuates; therefore, a predetermined slip rotational state that is scheduled in the slip control of the lock-up clutch deteriorates. In contrast, by suppressing load fluctuations of engine accessories during slip control of the lock-up clutch, fluctuations in the engine torque that is input to the lock-up clutch is suppressed. Accordingly, the lock-up capacity and the input torque in the lock-up clutch are kept in a relationship that maintains the predetermined slip rotational state, even if there is a load fluctuation request of the engine accessories during slip control. As a result, it is possible to prevent a slip rotational state from deteriorating as a result of load fluctuations of engine accessories during slip control of the lock-up clutch.

DETAILED DESCRIPTION OF EMBODIMENTS

Figure 1:
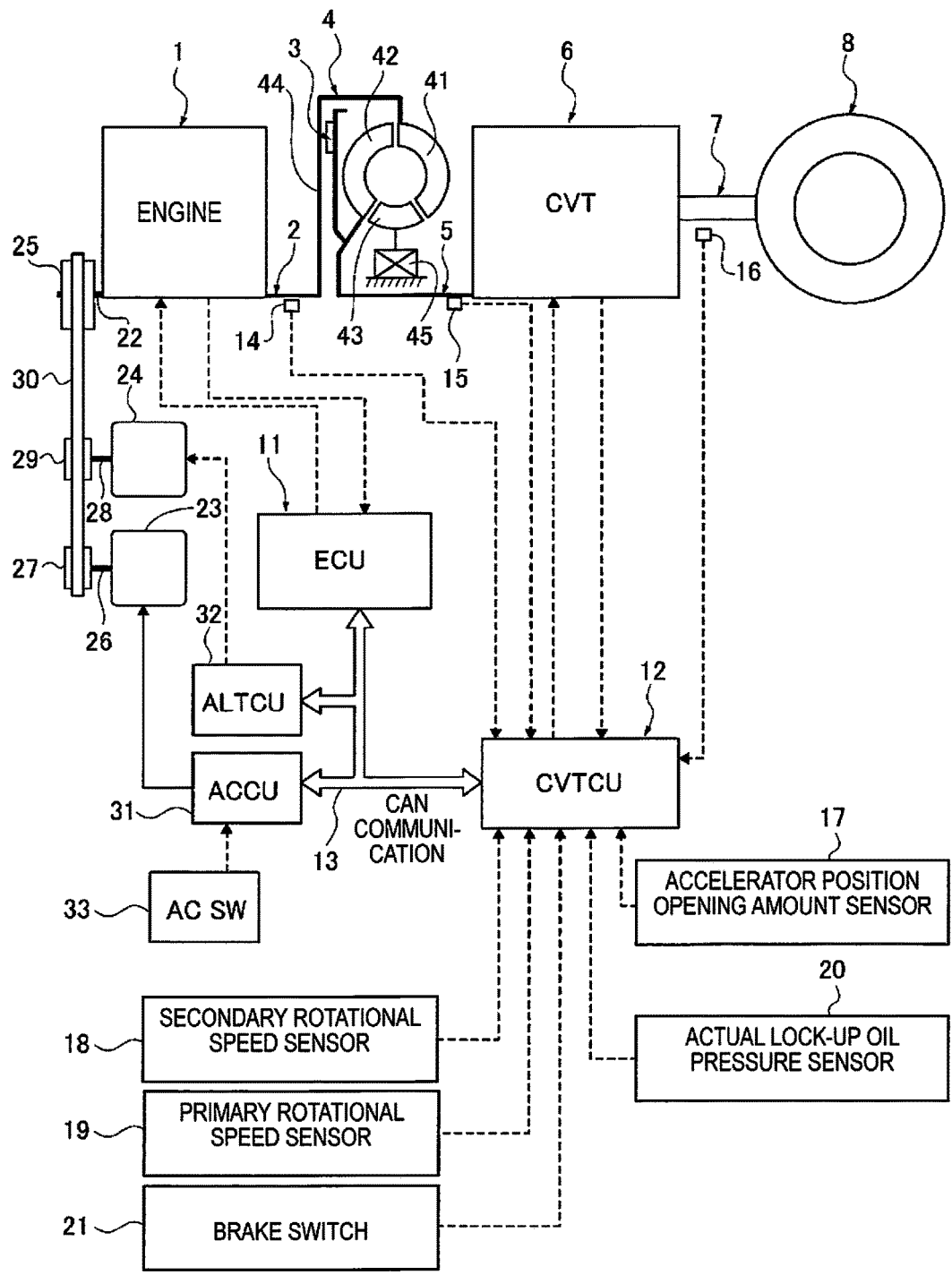
FIG. 1 is an overall system view illustrating an engine-equipped vehicle to which is applied the lock-up control method and control device according to the first embodiment.

A preferred embodiment for realizing the vehicle lock-up control method and control device of the present invention is described below based on the first embodiment illustrated in the drawings.

First Embodiment

The configuration is described first. The lock-up control method and control device in the first embodiment are applied to an engine-equipped vehicle equipped with a torque converter and a continuously variable transmission (CVT). The "overall system configuration," the "configuration of the cooperative control process of the lock-up clutch and air conditioner compressor," and the "configuration of the cooperative control process of the lock-up clutch and the alternator" will be separately described regarding the configurations of the lock-up control method and control device of an engine-equipped vehicle in the first embodiment.

Overall System Configuration

FIG. 1 illustrates an engine-equipped vehicle to which is applied the lock-up control method and control device of the first embodiment. The overall system configuration will be described below, based on FIG. 1.

The vehicle drive system comprises an engine 1, an engine output shaft 2, a lock-up clutch 3, a torque converter 4, a transmission input shaft 5, a continuously variable transmission 6 (transmission), a drive shaft 7, and drive wheels 8, as illustrated in FIG. 1.

An air conditioner compressor 23, an alternator 24, and the like are drivingly connected to the crankshaft 22 of the engine 1 as engine accessories. The drive coupling structure is configured from a first pulley 25 provided on the crankshaft 22, a second pulley 27 provided on a drive shaft 26 of the air conditioner compressor 23, a third pulley 29 provided on a rotational shaft 28 of the alternator 24, and a belt 30 wound around the first to the third pulleys 25, 27, 29.

The lock-up clutch 3 is built into the torque converter 4, couples the engine 1 and the continuously variable transmission 6 via the torque converter 4 by releasing the clutch, and directly connects the engine output shaft 2 and the transmission input shaft 5 by engaging the clutch. The engagement/slip engagement/release of this lock-up clutch 3 is controlled by the actual lock-up oil pressure that is regulated based on the line pressure, which is the source pressure, when a lock-up command value is output from a CVT control unit 12 to be described later. Line pressure is produced by regulating, using a line pressure solenoid valve, the pressure of the discharge oil from an oil pump, which is not shown, that is rotationally driven by the engine 1.

The torque converter 4 comprises a pump impeller 41, a turbine runner 42 that is disposed opposite the pump impeller 41, and a stator 43 that is disposed between the pump impeller 41 and the turbine runner 42. This torque converter 4 is a fluid coupling that transmits torque by the hydraulic oil filled therein being circulated to each blade of the pump impeller 41, the turbine runner 42, and the stator 43. The pump impeller 41 is coupled with the engine output shaft 2 via a converter cover 44, the inner surface of which is the engagement surface of the lock-up clutch 3. The turbine runner 42 is coupled with the transmission input shaft 5. The stator 43 is provided on a stationary member (transmission case, etc.) via a one-way clutch 45.

The continuously variable transmission 6 is a belt type continuously variable transmission that continuously controls the transmission ratio by assigning the belt contact diameter to a primary pulley and a secondary pulley, and the output rotation after shifting is transmitted to the drive wheels 8 via a drive shaft 7.

The drive control system comprises an engine control unit 11 (ECU), a CVT control unit 12 (CVTCU), an AC control unit 31 (ACCU), an ALT control unit 32 (ALTCU), and a CAN communication line 13, as illustrated in FIG. 1. That is, the four control units 11, 12, 31, 32 are connected so as to be capable of bidirectional communication via the CAN communication line 13.

An engine rotation sensor 14, a turbine rotation sensor 15 (=CVT input rotation sensor), and a CVT output rotation sensor 16 (=vehicle speed sensor) are provided as sensors for obtaining input information for drive control. Further provided are an accelerator position opening amount sensor 17, a secondary rotational speed sensor 18, a primary rotational speed sensor 19, an actual lock-up oil pressure sensor 20, a brake switch 21, an air conditioner switch 33, and the like.

The engine control unit 11 reduces the fuel injection amount to the engine 1 so as to obtain a torque reduction value that is based on the accelerator position opening amount APO when receiving a torque reduction signal requesting the start of an engine torque reduction control from the CVT control unit 12 via the CAN communication line 13. Then, when the torque reduction signal received from the CVT control unit 12 via the CAN communication line 13 stops during execution of an engine torque reduction control, a fuel injection control for obtaining a normal torque corresponding to the driver's request is restored.

The CVT control unit 12 carries out a transmission control for controlling the transmission ratio of the continuously variable transmission 6, a line pressure control, a lock-up control for controlling the engagement/slip engagement/release of the lock-up clutch 3, and the like. LU engagement slip control (during LU engagement), LU release slip control (during LU release), coasting capacity learning control, coast LU slip control, and the like are carried out as slip controls of the lock-up clutch 3. For example, in an initial-motion lock-up control, the line pressure itself is not stabilized while the line pressure, which is the source pressure of the actual lock-up oil pressure, is rising; therefore, the lock-up command value is delayed (the command value is maintained) while the line pressure is rising. Then, after a delay time has elapsed, the lock-up command value is raised, and a slip control (one example of an LU engagement slip control) is carried out to gradually reduce the slip rotational speed.

The AC control unit 31 carries out a compressor operation control, which repeats the driving/stopping of the air conditioner compressor 23, when the air conditioner switch 33 is ON. In addition, the AC control unit 31 executes a cooperative control for delaying the AC operation during LU engagement, during LU release, during coasting capacity learning control, or during coast LU slip control, in the CVT control unit 12.

When there is a power generation request due to a decrease in the capacity of a vehicle mounted battery or a regeneration request during deceleration, the ALT control unit 32 carries out an alternator power generation control or an alternator regeneration control for converting the driving energy of the engine 1 to electric energy by using the alternator 24. In addition, the ALT control unit 32 executes a cooperative control for applying a limit to the ALT load value during coasting capacity learning control or coast LU slip control in the CVT control unit 12.

Figure 2:
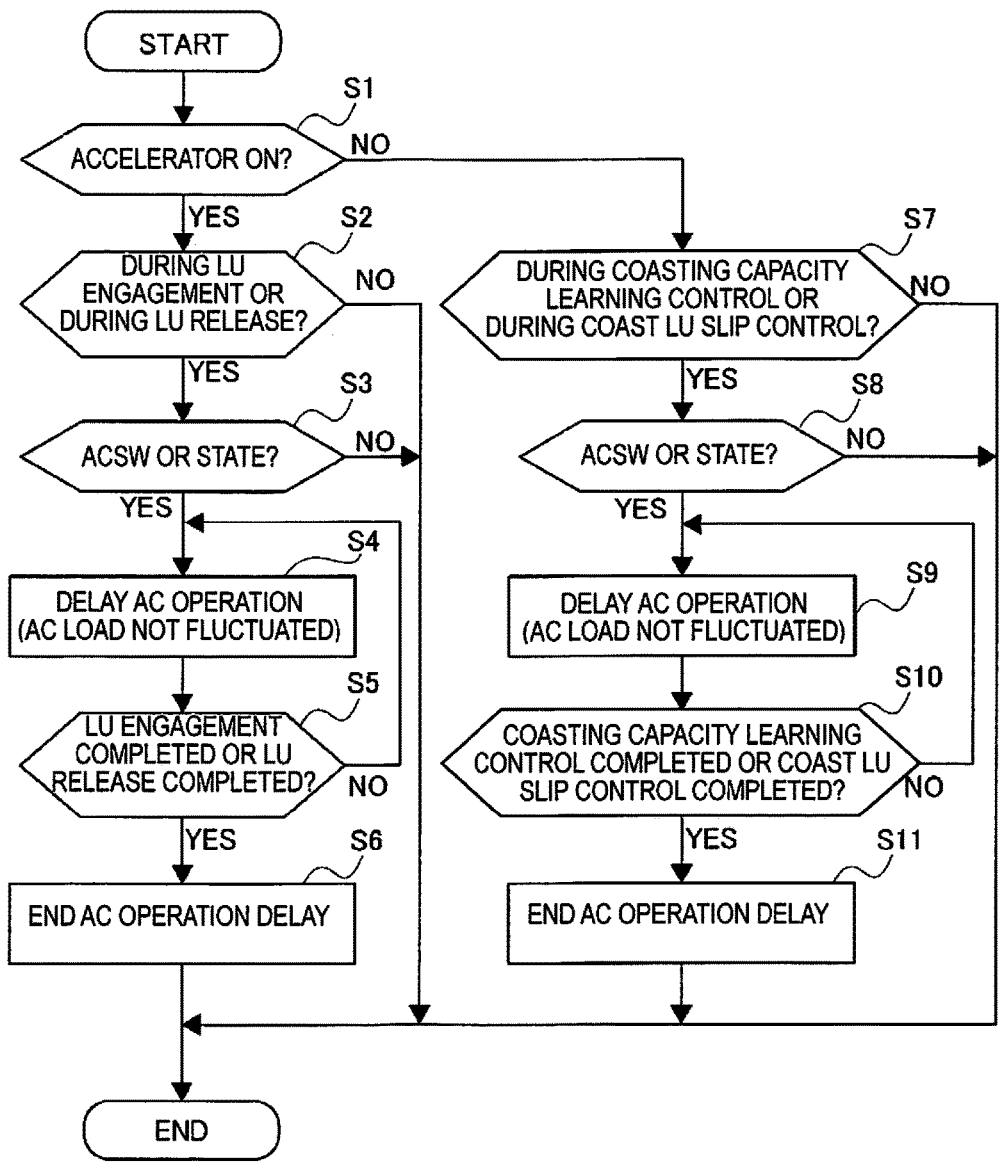
FIG. 2 is a flowchart illustrating the flow of a cooperative control process of the lock-up clutch and the air conditioner compressor that is executed in the CVT control unit of the first embodiment.

Configuration of the Cooperative Control Process of the Lock-Up Clutch and Air Conditioner Compressor FIG. 2 illustrates the flow of a cooperative control process of the lock-up clutch 3 and the air conditioner compressor 23 that is executed in the CVT control unit 12 of the first embodiment (cooperative control unit). Each step in FIG. 2 showing the configuration of the cooperative control process of the lock-up clutch 3 and the air conditioner compressor 23 will be described below. The description "LU" is an abbreviation for "lock-up," the description "AC (AC)" is an abbreviation for "air conditioner," and the description "ALT (ALT)" is an abbreviation for "alternator."

In Step S1, it is determined whether or not it is during an accelerator pedal depression operation. If YES (accelerator ON), the process proceeds to Step S2, and if NO (accelerator OFF), the process proceeds to Step S7. Here, in terms of the determination of an accelerator pedal depression operation, for example, it is determined to be during an accelerator pedal depression operation when the accelerator position opening amount APO from the accelerator position opening amount sensor 17 is an opening amount other than 0/8 opening amount (accelerator OFF: accelerator pedal release state). In addition, when using an accelerator switch, it is determined to be during an accelerator pedal depression operation when ON and determined to be during an accelerator pedal release operation when OFF.

In Step S2, following the determination of accelerator ON in Step S1, it is determined whether or not it is during LU engagement or during LU release. If YES (during LU engagement or during LU release), the process proceeds to Step S3, and if NO (LU engaged state or LU released state), the process proceeds to END. Here, "during LU engagement" refers to a slip control interval during which the lock-up clutch 3 is shifted from a released state to an engaged state by using a control to increase the lock-up capacity of the lock-up clutch 3. "During LU release" refers to a slip control interval during which the lock-up clutch 3 is shifted from an engaged state to a released state by using a control to decrease the lock-up capacity of the lock-up clutch 3.

In Step S3, following the determination of during LU engagement or during LU release in Step S2, it is determined whether or not the air conditioner switch 33 is in the ON state. If YES (ACSW ON), the process proceeds to Step S4, and if NO (ACSW OFF), the process proceeds to END.

In Step S4, following the determination that the ACSW is ON in Step S3 or the determination that LU engagement is uncompleted or LU release is uncompleted in Step S5, the AC operation is delayed (AC load is not fluctuated), and the process proceeds to Step S5. Here, "AC operation is delayed" means causing the engine load of the air conditioner compressor 23 to not fluctuate, such that, during LU engagement or during LU release in an ACSW ON state, the driving state is maintained even if there is a drive→stop request, and the stopped state is maintained even if there is a stop→drive request.

In Step S5, following the delay of the AC operation in Step S4, it is determined whether or not LU engagement is completed, or LU release is completed. If YES (LU engagement completed, or LU release completed), the process proceeds to Step S6, and if NO (LU engagement uncompleted, or LU release uncompleted), the process returns to Step S4.

In Step S6, following the determination that LU engagement is completed, or LU release is completed in Step S5, the AC operation delay is ended, and the process proceeds to END. Here, "AC operation delay is ended" means stopping the air conditioner compressor 23 when the driving state is being maintained by using an AC operation delay, even though a drive→stop request has already been issued. On the other hand, the air conditioner compressor 23 is driven when the stopped state is being maintained by using an AC operation delay, even though a stop→drive request has already been issued.

In Step S7, following the determination of accelerator OFF in Step S1, it is determined whether or not it is during coasting capacity learning control or during coast LU slip control, when traveling by coasting with the foot away from the accelerator. If YES (during coasting capacity learning control or during coast LU slip control), the process proceeds to Step S8, and if NO (other than during coasting control), the process proceeds to END. Here, "during coasting capacity learning control" refers to a coasting capacity learning control interval whereby, when experiencing traveling by coasting, a learning value update differential rotation is generated by using a control to reduce the lock-up hydraulic pressure command, to obtain the learning value of the lock-up capacity of the lock-up clutch 3 during coasting. "During coast LU slip control" refers to a coast LU slip control interval, in which, during coasting with the lock-up clutch 3 in an engaged state, upon shifting to a released state by using a control to reduce the lock-up differential pressure, the vehicle shifts to a slip rotational state by using generation of a differential rotation.

In Step S8, following the determination of during coasting capacity learning control or during coast LU slip control in Step S7, it is determined whether or not the air conditioner switch 33 is in the ON state. If YES (ACSW ON), the process proceeds to Step S9, and if NO (ACSW OFF), the process proceeds to END.

In Step S9, following the determination that the ACSW is ON in Step S8 or the determination that coasting capacity learning control is uncompleted or coast LU slip control is uncompleted in Step S10, the AC operation is delayed (AC load is not fluctuated) in the same manner as in Step S4, and the process proceeds to Step S10.

In Step S10, following the delay of the AC operation in Step S9, it is determined whether or not coasting capacity learning control is completed or coast LU slip control is completed. If YES (coasting capacity learning control completed or coast LU slip control completed), the process proceeds to Step S11, and if NO (coasting capacity learning control uncompleted or coast LU slip control uncompleted), the process returns to Step S9.

In Step S11, following the determination that coasting capacity learning control is completed or that coast LU slip control is completed in Step S10, the AC operation delay is ended, in the same manner as in Step S6, and the process proceeds to END.

Configuration of the Cooperative Control Process of the Lock-Up Clutch and Alternator]

Figure 3:
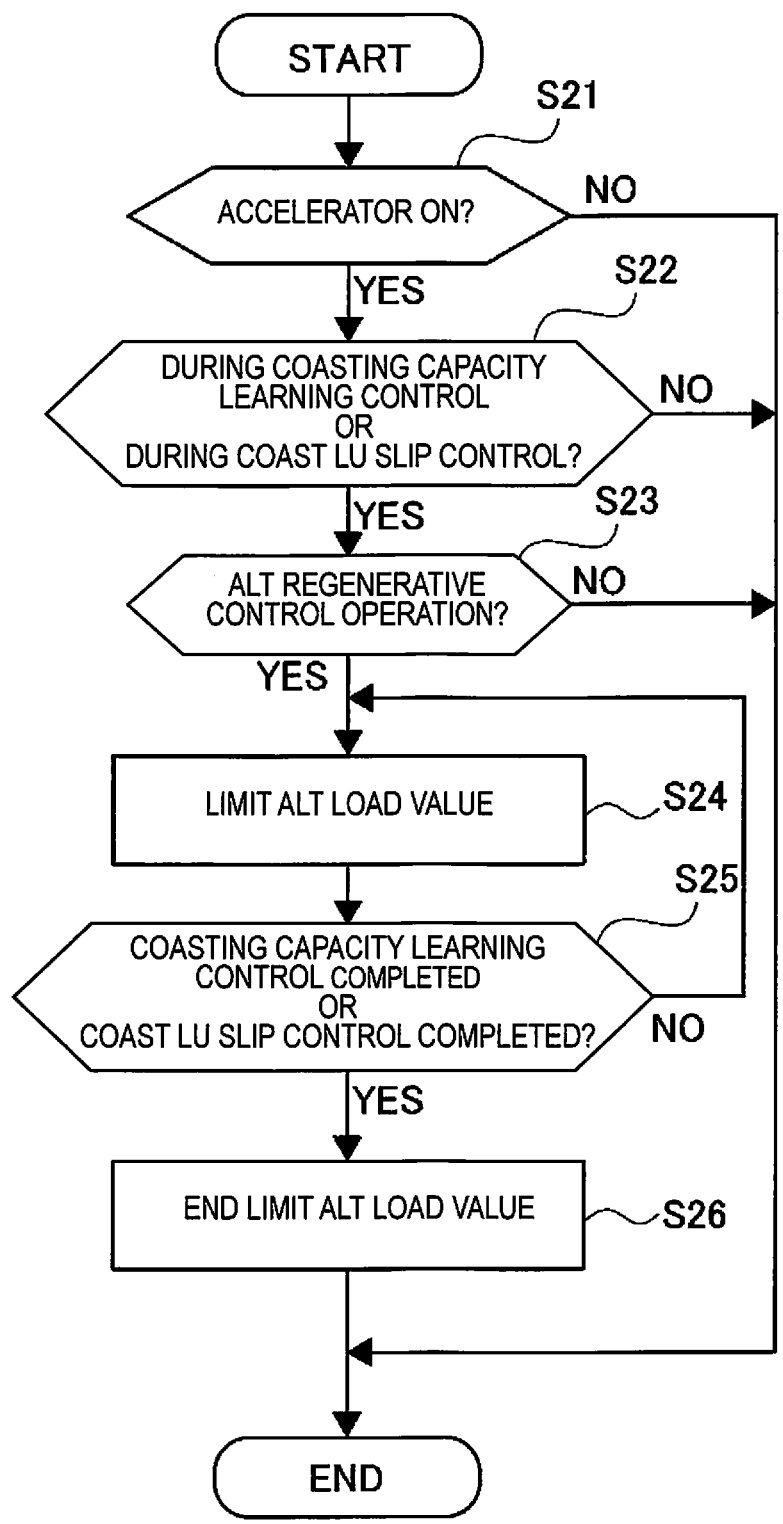
FIG. 3 is a flowchart illustrating the flow of a cooperative control process of the lock-up clutch and the alternator that is executed in the CVT control unit of the first embodiment.

FIG. 3 illustrates the flow of a cooperative control process of the lock-up clutch 3 and the alternator 24 that is executed in the CVT control unit 12 of the first embodiment (cooperative control unit). Each step in FIG. 3 showing the configuration of the cooperative control process of the lock-up clutch 3 and the alternator 24 will be described below.

In Step S21, it is determined whether or not it is during an accelerator pedal release operation. If YES (accelerator OFF), the process proceeds to Step S22, and if NO (accelerator ON), the process proceeds to END. Here, in terms of the determination of an accelerator pedal release operation, for example, it is determined to be during an accelerator pedal release operation when the accelerator position opening amount APO of the accelerator position opening amount sensor 17 is an 0/8 opening amount (accelerator OFF: accelerator pedal release state). In addition, when using an accelerator switch, it is determined to be during an accelerator pedal release operation when OFF.

In Step S22, following the determination of accelerator OFF in Step S21, it is determined whether or not it is during coasting capacity learning control or during coast LU slip control, when traveling by coasting with the foot away from the accelerator, in the same manner as in Step S7 in FIG. 2. If YES (during coasting capacity learning control or during coast LU slip control), the process proceeds to Step S23, and if NO (other than during coasting control), the process proceeds to END.

In Step S23, following the determination of during coasting capacity learning control or during coast LU slip control in Step S22, it is determined whether or not the alternator 24 is in a regenerative control operation. If YES (ALT regenerative control operation), the process proceeds to Step S24, and if NO (ALT regenerative control inoperative), the process proceeds to END.

In Step S24, following the determination that ALT regenerative control is in operation in Step S23 or the determination that coasting capacity learning control is uncompleted or coast LU slip control is uncompleted in Step S25, a limit is imparted to the ALT load value, and the process proceeds to Step S25. Here, "limit is imparted to the ALT load value" means restricting changes in the ALT load value from the start of control, in order to suppress fluctuations in the engine load by using the alternator 24, even when there is a request to change the ALT load value that is output to the alternator 24, during coasting capacity learning control or during coast LU slip control when regenerative control is in operation. Examples of modes to limit changes in the ALT load value include: maintaining the ALT load value from the start of control without change, limiting changes in the ALT load value from the start of control to an allowable change amount, and limiting changes in the ALT load value to changes having an allowable change gradient.

In Step S25, after imparting a limit to the ALT load value in Step S24, it is determined whether or not coasting capacity learning control is completed or coast LU slip control is completed. If YES (coasting capacity learning control completed or coast LU slip control completed), the process proceeds to Step S26, and if NO (coasting capacity learning control uncompleted or coast LU slip control uncompleted), the process returns to Step S24.

In Step S26, following the determination that coasting capacity learning control is completed or that coast LU slip control is completed in Step S25, restriction on the ALT load is ended, and the process proceeds to END. Here, "restriction on the ALT load is ended" means to remove restrictions on requests to change the ALT load value that are output to the alternator 24 and to change the ALT load value, which was restricted, according to the request.

Next, the actions are described. The "action of the cooperative control process with the air conditioner compressor," the "action of the cooperative control process with the alternator," the "action of cooperative control during LU engagement," the "action of the cooperative control during coasting capacity learning control," the "action of cooperative control during coast LU slip control," and the "characteristic action in the cooperative control" will be separately described, regarding the lock-up control actions of the first embodiment.

Action of the Cooperative Control Process with the Air Conditioner Compressor

The action of the cooperative control process of the lock-up clutch 3 and the air conditioner compressor 23 will be described below, based on the flowchart shown in FIG. 2.

At the time of an accelerator pedal depression operation, when the lock-up clutch 3 is in an LU engaged state or an LU released state, the process proceeds from Step S1→Step S2→END in the flowchart of FIG. 2. At the time of an accelerator pedal depression operation, when the lock-up clutch 3 is involved in LU engagement or involved in LU release but the air conditioner switch 33 is in an OFF state, the process proceeds from Step S1→Step S2→Step S3→END in the flowchart of FIG. 2. That is, a cooperative control of the lock-up clutch 3 and the air conditioner compressor 23 is not executed unless a drive slip control condition and an AC operation condition are satisfied.

On the other hand, at the time of an accelerator pedal depression operation, when the lock-up clutch 3 is involved in LU engagement or involved in LU release and the air conditioner switch 33 is in an ON state, the process proceeds from Step S1→Step S2→Step S3→Step S4→Step S5 in the flowchart of FIG. 2. Then, while it is being determined that LU engagement is uncompleted or that LU release is uncompleted in Step S5, the flow that proceeds from Step S4→Step S5 is repeated. That is, from the establishment of the drive slip control condition and the AC operation condition until it is determined that LU engagement is completed or that LU release is completed, the AC operation is delayed, and a cooperative control in which AC load of the air conditioner compressor 23 is not fluctuated is carried out. Specifically, when there is a drive→stop request with respect to the air conditioner compressor 23 when the air conditioner compressor 23 is being driven and during LU engagement or during LU release with the air conditioner switch 33 in the ON state, the driving state of the air conditioner compressor 23 is maintained. In addition, when there is a stop→drive request with respect to the air conditioner compressor 23 when the air conditioner compressor 23 is stopped and during LU engagement or during LU release with the air conditioner switch 33 in the ON state, the stopped state of the air conditioner compressor 23 is maintained.

Then, when it is determined that LU engagement is completed or that LU release is completed in Step S5, the process proceeds from Step S5 to Step S6→END, and the AC operation delay is ended. When an AC operation delay is in progress, in which the driving state of the air conditioner compressor 23 is maintained, at the time of ending the AC operation delay, the air conditioner compressor 23 is stopped in response to a drive→stop request. On the other hand, when an AC operation delay is in progress, in which the stopped state of the air conditioner compressor 23 is maintained, at the time of ending the AC operation delay, the air conditioner compressor 23 is driven in response to a stop→drive request.

At the time of an accelerator pedal release operation, when the lock-up clutch 3 is other than involved in coasting capacity learning control or coast LU slip control, the process proceeds from Step S1→Step S7→END in the flowchart of FIG. 2. At the time of an accelerator pedal release operation, if the lock-up clutch 3 is involved in coasting capacity learning control or coast LU slip control, but the air conditioner switch 33 is in an OFF state, the process proceeds from Step S1→Step S7→Step S8→END in the flowchart of FIG. 2. That is, a cooperative control of the lock-up clutch 3 and the air conditioner compressor 23 is not executed unless a coast slip control condition and an AC operation condition are satisfied.

On the other hand, at the time of an accelerator pedal release operation, if the lock-up clutch 3 is involved in coasting capacity learning control or coast LU slip control, and the air conditioner switch 33 is in an ON state, the process proceeds from Step S1→Step S7→Step S8→Step S9→Step S10 in the flowchart of FIG. 2. Then, while it is being determined that coasting capacity learning control is uncompleted or that coast LU slip control is uncompleted in Step S10, the flow that proceeds from Step S9→Step S10 is repeated. That is, from the establishment of the coast slip control condition and the AC operation condition until it is determined that coasting capacity learning control is completed or that coast LU slip control is completed, the AC operation is delayed, and a cooperative control in which AC load of the air conditioner compressor 23 is not fluctuated is carried out. Specifically, when there is a drive→stop request with respect to the air conditioner compressor 23 when the air conditioner compressor 23 is being driven and during coasting capacity learning control or during coast LU slip control with the air conditioner switch 33 in the ON state, the driving state of the air conditioner compressor 23 is maintained. In addition, when there is a stop→drive request with respect to the air conditioner compressor 23 when the air conditioner compressor 23 is stopped and during coasting capacity learning control or during coast LU slip control with the air conditioner switch 33 in the ON state, the stopped state of the air conditioner compressor 23 is maintained.

Then, when it is determined that coasting capacity learning control is completed or that coast LU slip control is completed in Step S10, the process proceeds from Step S10 to Step S11→END, and the AC operation delay is ended. When an AC operation delay is in progress, in which the driving state of the air conditioner compressor 23 is maintained, at the time of ending the AC operation delay, the air conditioner compressor 23 is stopped in response to a drive→stop request. On the other hand, when an AC operation delay is in progress, in which the stopped state of the air conditioner compressor 23 is maintained, at the time of ending the AC operation delay, the air conditioner compressor 23 is driven in response to a stop→drive request.

Action of the Cooperative Control Process with the Alternator

The action of the cooperative control process of the lock-up clutch 3 and the alternator 24 will be described below, based on the flowchart shown in FIG. 3.

At the time of an accelerator pedal release operation, when the lock-up clutch 3 is other than involved in coasting capacity learning control or coast LU slip control, the process proceeds from Step S2→Step S22→END in the flowchart of FIG. 3. At the time of an accelerator pedal release operation, if the lock-up clutch 3 is involved in coasting capacity learning control or coast LU slip control, but the alternator 24 is not carrying out a regenerative control, the process proceeds from Step S21→Step S22→Step S23→END in the flowchart of FIG. 3. That is, a cooperative control of the lock-up clutch 3 and the alternator 24 is not executed unless a coast slip control condition and an ALT regenerative control condition are satisfied.

On the other hand, at the time of an accelerator pedal release operation, if the lock-up clutch 3 is involved in coasting capacity learning control or coast LU slip control, and the alternator 24 is in a regenerative control operation, the process proceeds from Step S21→Step S22→Step S23→Step S24→Step S25 in the flowchart of FIG. 3. Then, while it is being determined that coasting capacity learning control is uncompleted or that coast LU slip control is uncompleted in Step S25, the flow that proceeds from Step S24→Step S25 is repeated. That is, from the establishment of the coast slip control condition and the ALT regenerative control condition until it is determined that coasting capacity learning control is completed or that coast LU slip control is completed, a limit is imparted to the ALT load value, and a cooperative control is carried out, in which fluctuation in the engine load by using the alternator 24 is suppressed. Specifically, when there is a request to change the ALT load value that is output to the alternator 24 during coasting capacity learning control or during coast LU slip control when regenerative control of the alternator 24 is in operation, restrictions such as maintaining the ALT load value are applied.

Then, when it is determined that coasting capacity learning control is completed or that coast LU slip control is completed in Step S25, the process proceeds from Step S25 to Step S26→END, and the restriction to the ALT load is ended. When the restriction on the ALT load is ended, the ALT load value, which was restricted, is changed according to a request to change the ALT load value that is output to the alternator 24.

Action of the Cooperative Control During LU Engagement

Figure 4:
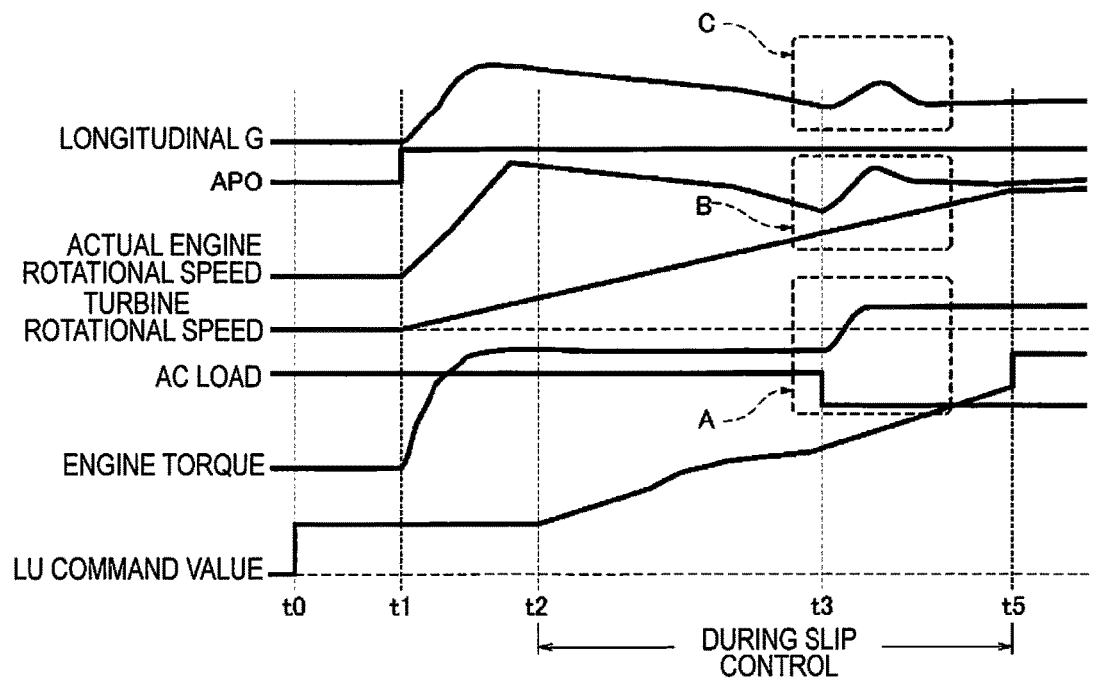
FIG. 4 is a time chart illustrating the respective characteristics of the longitudinal G/accelerator position opening amount APO/actual engine rotational speed Ne/turbine rotational speed Nt/AC load/engine torque Te/lock-up command value (LU command value) when there is an AC load fluctuation with a timing of immediately before clutch engagement, during a slip control of an initial-motion lock-up control (release engagement) of a comparative example.
Figure 5:
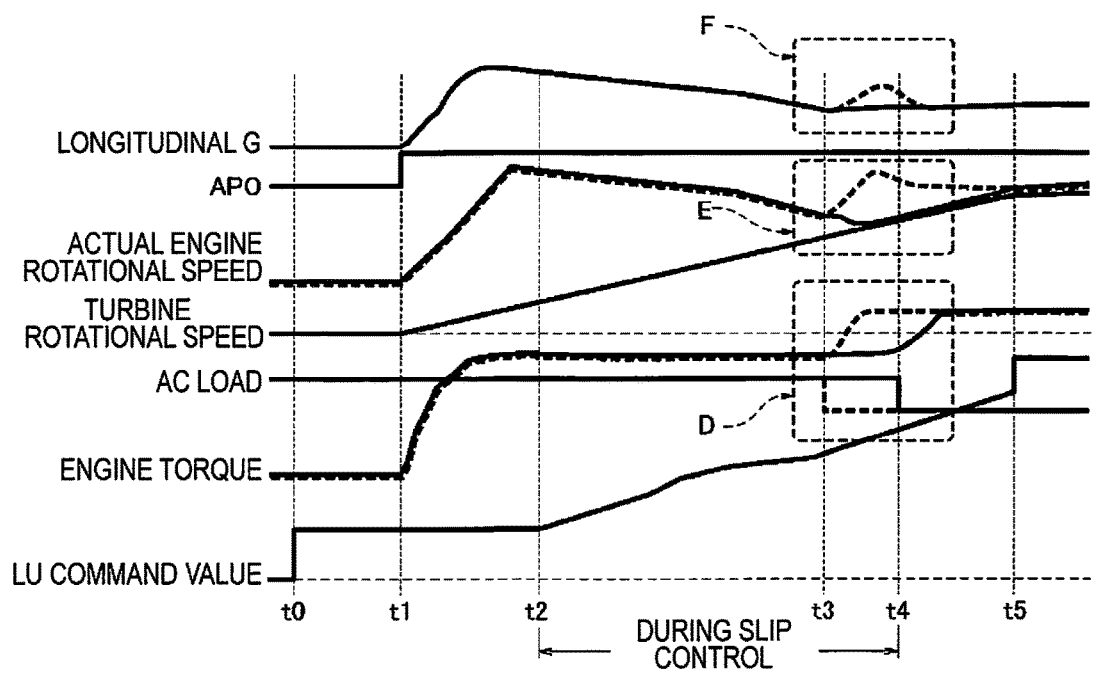
FIG. 5 is a time chart illustrating the respective characteristics of the longitudinal G/accelerator position opening amount APO/actual engine rotational speed Ne/turbine rotational speed Nt/AC load/engine torque Te/lock-up command value (LU command value) when there is an AC load fluctuation with a timing of immediately before clutch engagement, during a slip control of an initial-motion lock-up control (release engagement) of the first embodiment.

FIG. 4 is a time chart showing the case when there is an AC load fluctuation with a timing of immediately before clutch engagement, during a slip control of an initial-motion lock-up control (release→engagement) of a comparative example. FIG. 5 is a time chart showing the case when there is an AC load fluctuation with a timing of immediately before clutch engagement, during a slip control of an initial-motion lock-up control (release→engagement) of the first embodiment. The action of the cooperative control during LU engagement will be described below based on the time charts illustrated in FIG. 4 and FIG. 5. In FIG. 4 and FIG. 5, time t0 is a brake OFF operation time, time t1 is an accelerator pedal depression operation time, time t2 is a lock-up capacity generation time, time t3 is an AC load fluctuation time, time t4 is a lock-up engagement end time, and time t5 is an initial-motion lock-up control end time.

The initial-motion lock-up control is roughly divided into a stroke control region (time t0-time t2), a slip control region (time t2-time t3), and a smooth ON control region (time t3-time t5). The stroke control region (time t0-time t2) is a section in which the lock-up clutch 3 is shifted from a fully released state to a clutch stroke state in which lock-up capacity starts to occur, by using a feed forward control. The slip control region (time t2-time t3) is a section in which the slip rotational speed of the lock-up clutch 3 is gradually decreased by using a feedback control. The smooth ON control region (time t3-time t5) is a section for smoothly engaging the lock-up clutch 3 immediately before engagement using a slip engagement state, by using a feed forward control (a portion of the slip control region).

First, the actions when there is an AC load fluctuation with a timing of immediately before clutch engagement, during a slip control of an initial-motion lock-up control (release→engagement) of a comparative example, will be described based on FIG. 4. Here, since the slip rotational speed (=actual engine rotational speed-turbine rotational speed) converges at time t5, the section during slip control of the initial-motion lock-up control (release→engagement) in the comparative example becomes the slip control interval of time t2-time t5.

When there is an AC load fluctuation (reduction in the accessory load) at time t3 immediately before clutch engagement during a slip control, the engine torque starts to rise accompanying a stepwise decrease in the AC load, as illustrated by the characteristic in the frame indicated by arrow A in FIG. 4. When the engine torque increases, the actual engine rotational speed rises, creating a rotation peeling state in which the slip rotational speed, which was in a converging trend up to time t3, starts to increase again, as illustrated by the characteristic in the frame indicated by arrow B in FIG. 4. Consequently, longitudinal G protrudes (longitudinal G increases then decreases immediately) as illustrated by the characteristic in the frame indicated by arrow C in FIG. 4, resulting in shock due to longitudinal G fluctuation.

Next, the actions when there is an AC load fluctuation with a timing of immediately before clutch engagement, during a slip control of an initial-motion lock-up control (release→engagement) of the first embodiment, will be described based on FIG. 5. Here, since the slip rotational speed (=actual engine rotational speed-turbine rotational speed) converges at time t4, the section during slip control of the initial-motion lock-up control (release→engagement) in the first embodiment becomes the slip control interval of time t2-time t4.

When there is a request for AC load fluctuation (reduction in the accessory load) at time t3 immediately before clutch engagement during a slip control, the AC operation is delayed so that the AC load does not fluctuate from time t3 to time t4, as illustrated by the characteristic in the frame indicated by arrow D in FIG. 5. Accordingly, the engine torque does not fluctuate from time t3 to time t4. Therefore, the actual engine rotational speed decreases toward the turbine rotational speed, and the slip rotational speed converges by time t4, while maintaining the convergence tendency up to time t3, as illustrated by the characteristic in the frame indicated by arrow E in FIG. 5. Accordingly, protrusion of longitudinal G is suppressed, and it is possible to prevent shock due to longitudinal G fluctuation, as illustrated by the characteristic in the frame indicated by arrow F in FIG. 5.

Action of the Cooperative Control During Coasting Capacity Learning Control

Figure 6:
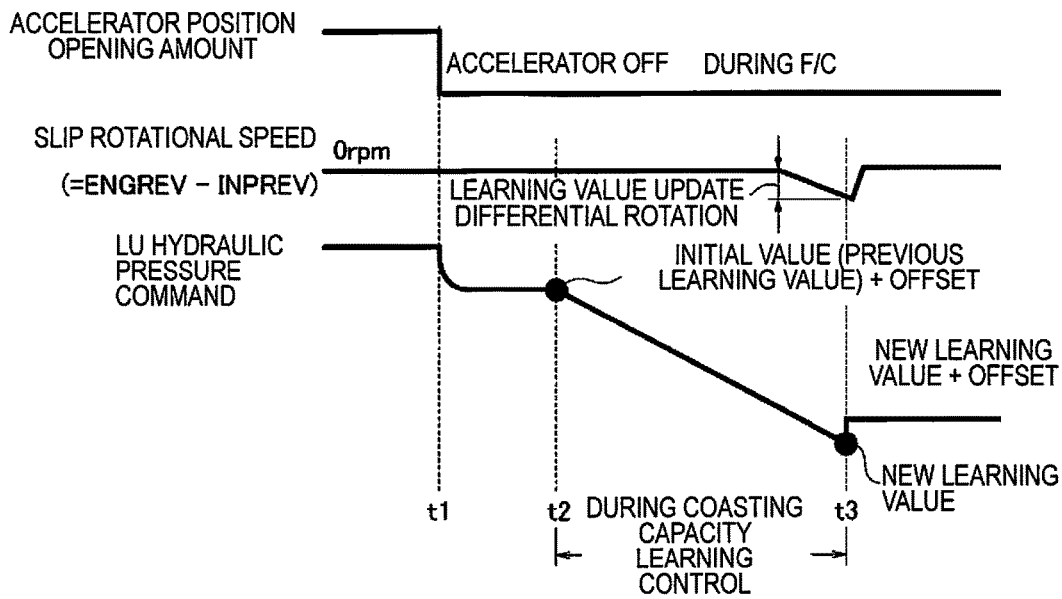
FIG. 6 is a time chart illustrating the respective characteristics of the accelerator position opening amount APO/slip rotational speed/LU hydraulic pressure (LU command value) describing one example of a coasting capacity learning control.
Figure 7:
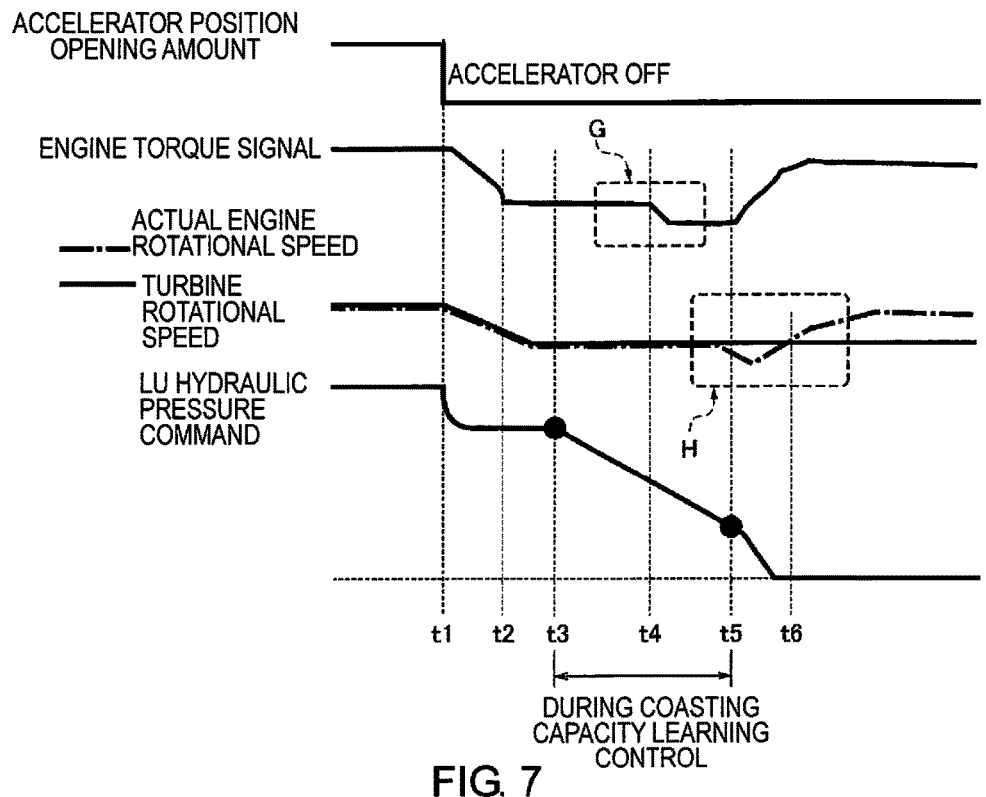
FIG. 7 is a time chart illustrating the respective characteristics of the accelerator position opening amount APO/engine torque signal/engine rotational speed/turbine rotational speed/LU hydraulic pressure (LU command value) describing an action to prevent LU deviation due to AC load fluctuations during coasting capacity learning of the first embodiment.

FIG. 6 illustrates a time chart describing one example of a coasting capacity learning control, and FIG. 7 illustrates a time chart describing an action to prevent LU deviation due to AC load fluctuations during coasting capacity learning of the first embodiment. The action of the cooperative control during coasting capacity learning control will be described below based on the time charts illustrated in FIG. 6 and FIG. 7.

First, details of the coasting capacity learning control will be described based on FIG. 6. The object of the coasting capacity learning control, which learns and controls the coast LU capacity, is to decrease the LU hydraulic pressure as much as possible during coasting (fuel-cut state), in order to improve the LU release responsiveness. Then, the effects on performance that can be obtained by lowering the LU capacity during coasting from an initial value to a low hydraulic pressure after learning include (a) Prevention of engine stalling (at the time of rapid deceleration)
(b) Improvement of LU release shock (at the time of gentle deceleration)
(c) Improvement of tip-in shock (at the time of re-acceleration from coasting)
and the like. Here, tip-in shock (Tip-in Shock) refers to shock caused by stepwise input torque at the time of re-acceleration from a coasting state.

In contrast, coasting capacity learning control is carried out when experiencing traveling in which a drive traveling state with the lock-up clutch 3 engaged transitions to a coast traveling state by the foot being released from the accelerator. The coasting capacity learning control is a control to search for a slip point (coast LU capacity that is balanced with the coasting torque of the engine), after continuing a state that is close to a steady state, when the vehicle speed is equal to or greater than an LU permission vehicle speed (FIG. 6). That is, the vehicle speed at which coasting capacity learning control is carried out is, for example, equal to or greater than the LU permission vehicle speed of 60 km/h-30 km/h. Then, when an accelerator pedal release operation is carried out at time t1 in FIG. 6, (1) the LU hydraulic pressure command is reduced to an initial value (unlearned), and the process waits for a while till time t2. (2) The LU hydraulic pressure command is gradually lowered from time t2 toward time t3. (3) When a predetermined slip (learning value update differential rotation) is detected at time t3, (4) the learning value is updated and the LU hydraulic pressure command is increased so as to return to the LU engaged state. The learning value is estimated by using such a procedure. The LU hydraulic pressure command at time t2 is "initial value (previous learning value)+offset," the LU hydraulic pressure command at time t3 is "new learning value," and after time t3, the LU hydraulic pressure command is increased to "new learning value+offset."

The action when there is an AC load fluctuation during a coasting capacity learning control in the comparative example will be described based on FIG. 7. In FIG. 7, time t1 is an accelerator pedal release operation time, time t2 is an engine coasting torque arrival time, time t3 is an LU hydraulic pressure command reduction start time, time t4 is an AC load fluctuation time, and time t5 is a learning value update differential rotation detection time (=LU deviation generation time). Here, the section during coasting capacity learning control in the comparative example becomes the coasting capacity learning control interval between time t3-time t5.

When an accelerator pedal release operation is carried out at time t1, the LU hydraulic pressure command is reduced to an initial value (previous learning value+offset). The engine reaches a coasting torque at time t2 and a reduction in the LU hydraulic pressure command is started at time t3. When there is an AC load fluctuation (increase in the AC load) at time t4, which is during the coasting capacity learning control, the engine torque decreases accompanying the increase in the AC load, as illustrated by the characteristic in the frame indicated by arrow G in FIG. 7. If the engine torque decreases, the actual engine rotational speed decreases as illustrated by the characteristic in the frame indicated by arrow H in FIG. 7, and a predetermined slip (learning value update differential rotation) is detected due to generation of an LU deviation (LU release) at time t5. When LU deviation occurs, fuel consumption and the feeling of drivability are deteriorated. LU deviation has the relationship: turbine rotational speed>actual engine rotational speed between time t5 and time t6, then turbine rotational speed=actual engine rotational speed at the instant of time t6, which shifts to actual engine rotational speed>turbine rotational speed after time t6.

In contrast, in the first embodiment, when there is a request for AC load fluctuation (increase in the AC load) at time t4, the AC operation is delayed so that the AC load does not fluctuate even after time t4. Accordingly, the engine torque does not fluctuate until the coasting capacity learning control is ended. Therefore, coasting capacity learning control is carried out, and generation of LU deviation is prevented, as illustrated in FIG. 6. As a result, fuel consumption and the feeling of drivability are not deteriorated.

Action of the Cooperative Control During Coast LU Slip Control

Figure 8:
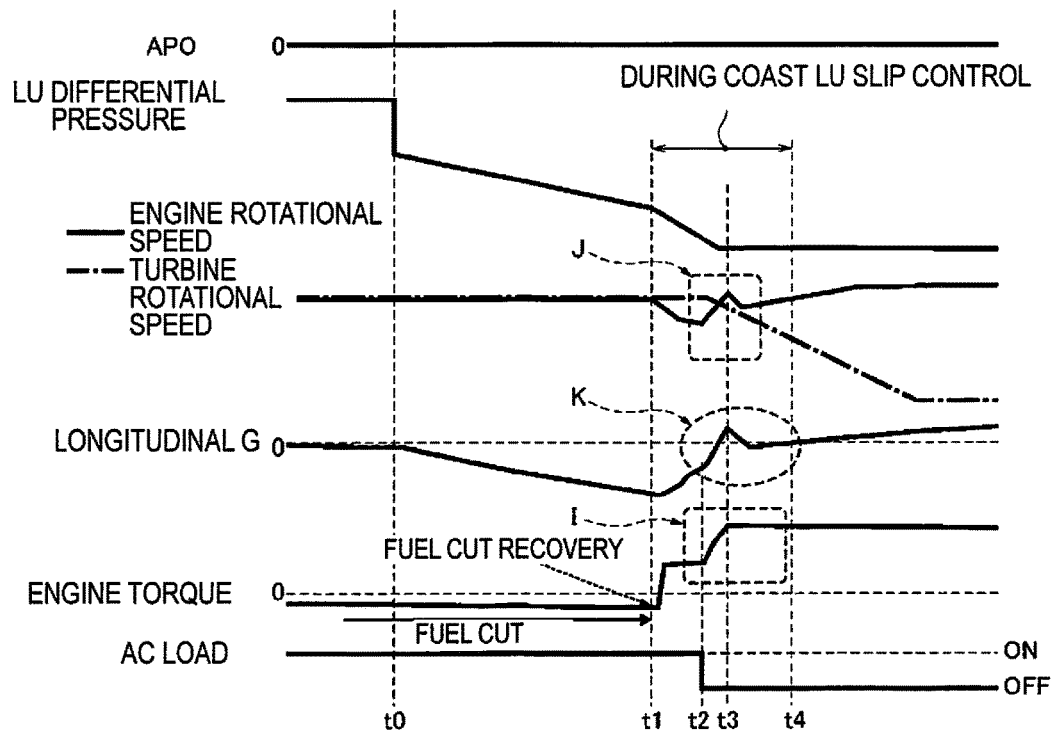
FIG. 8 is a time chart illustrating the respective characteristics of the accelerator position opening amount APO/LU differential pressure/actual engine rotational speed Ne/turbine rotational speed Nt/longitudinal G/engine torque Te/AC load when there is an AC load fluctuation with a timing of immediately before clutch release, during a coast LU slip control in a coast lock-up control (engagement→release) of a comparative example.
Figure 9:
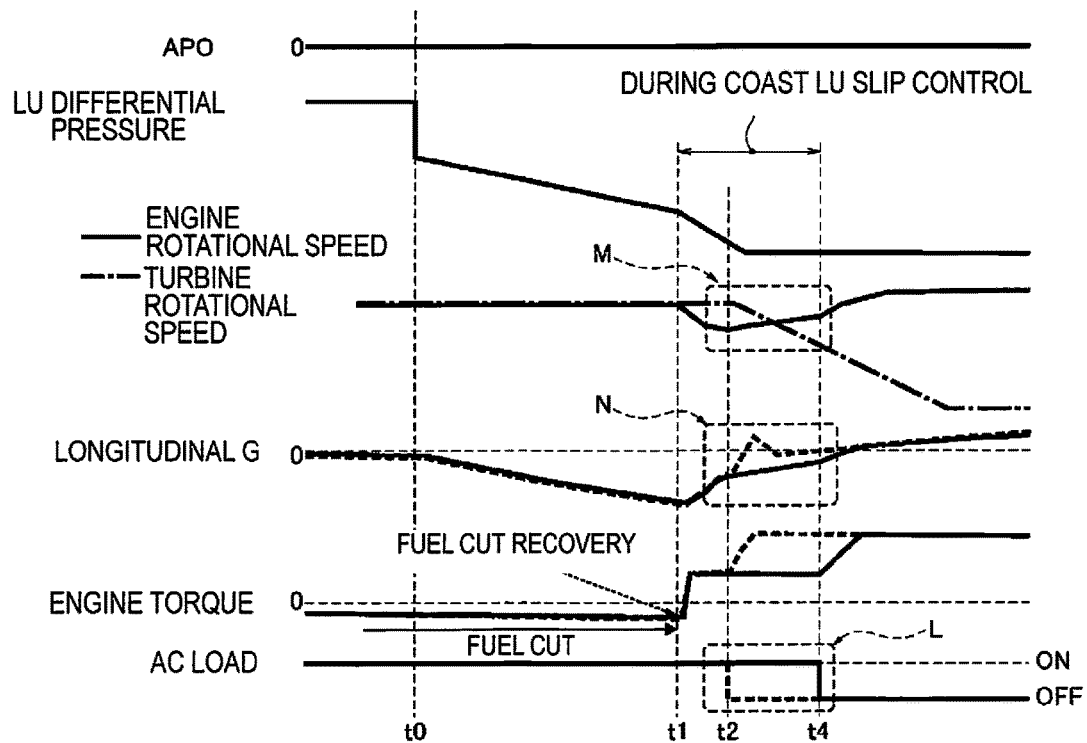
FIG. 9 is a time chart illustrating the respective characteristics of the accelerator position opening amount APO/LU differential pressure/actual engine rotational speed Ne/turbine rotational speed Nt/longitudinal G/engine torque Te/AC load when there is an AC load fluctuation with a timing of immediately before clutch release, during a coast LU slip control in a coast lock-up control (engagement→release) of the first embodiment.

FIG. 8 is a time chart showing the case when there is an AC load fluctuation with a timing of immediately before clutch release during a coast LU slip control of a coast lock-up control (engagement→release) of the comparative example. FIG. 9 is a time chart showing the case when there is an AC load fluctuation with a timing of immediately before clutch release, during a coast LU slip control of a coast lock-up control (engagement→release) of the first embodiment. The action of the cooperative control during coast LU slip control will be described below based on the time charts illustrated in FIG. 8 and FIG. 9.

In FIG. 8 and FIG. 9, time t0 is an LU differential pressure reduction start time, time t1 is a fuel cut recovery time, time t2 is an AC load fluctuation time, time t3 is an engine torque increase point arrival time, and time t4 is a coast LU slip control end time.

The coast lock-up control is roughly divided into an LU differential pressure control region during fuel cut (time t0-time t1) and an LU differential pressure control region during fuel cut recovery (time t1-time t4). In the LU differential pressure control region during fuel cut, the continuously variable transmission 6 downshifts to the low side accompanying a coast deceleration while traveling; therefore, longitudinal G decreases.

The action when there is an AC load fluctuation at a timing of immediately before clutch release, during a coast LU slip control of a coast lock-up control (engagement→release), of the comparative example will be described based on FIG. 8. Here, since the slip rotational speed (=actual engine rotational speed-turbine rotational speed) is generated at time t1, the section during coast LU slip control of the coast lock-up control (engagement→release) in the comparative example becomes the coast LU slip control interval from time t1 to time t4, when the coast LU slip control ends.

When there is an AC load fluctuation (reduction in the accessory load) at time t2 immediately before clutch release during a coast LU slip control, the engine torque starts to rise accompanying a stepwise decrease in the AC load, as illustrated by the characteristic in the frame indicated by arrow I in FIG. 8. When the engine torque increases toward time t3, the actual engine rotational speed rises, creating a state in which the slip rotational speed, which was being increased from t1, converges again, as illustrated by the characteristic in the frame indicated by arrow J in FIG. 8. Consequently, longitudinal G protrudes (longitudinal G increases then decreases immediately) as illustrated by the characteristic in the frame indicated by arrow K in FIG. 8, resulting in a lock-up release shock due to longitudinal G fluctuation.

Next, the action when there is an AC load fluctuation at a timing of immediately before clutch release, during a coast LU slip control of a coast lock-up control (engagement→release), of the first embodiment will be described based on FIG. 9. Here, since the slip rotational speed (=actual engine rotational speed-turbine rotational speed) is generated at time t1, the section during coast LU slip control of the coast lock-up control (engagement→release) in the first embodiment becomes the coast LU slip control interval from time t1 to time t4, when the coast LU slip control ends.

When there is a request for AC load fluctuation (reduction in the accessory load) at time t2 immediately before clutch release during a coast LU slip control, the AC operation is delayed so that the AC load does not fluctuate from time t2 to time t4, as illustrated by the characteristic in the frame indicated by arrow L in FIG. 9. Accordingly, the engine torque does not fluctuate from time t2 to time t4. Therefore, the actual engine rotational speed gradually increases from time t2 to time t4, and the slip rotational speed exceeds an LU release determination threshold by time t4, as illustrated by the characteristic in the frame indicated by arrow M in FIG. 9. Accordingly, protrusion of longitudinal G is suppressed, and it is possible to prevent a lock-up release shock due to longitudinal G fluctuation, as illustrated by the characteristic in the frame indicated by arrow N in FIG. 9.

Characteristic Action of the Cooperative Control

In the first embodiment, during slip control of the lock-up clutch 3, a cooperative control that suppresses load fluctuations of engine accessories such as the air conditioner compressor 23 and alternator 24 is carried out. That is, when there are load fluctuations of engine accessories during slip control of the lock-up clutch 3, the engine torque that is input to the lock-up clutch 3 fluctuates; therefore, a predetermined slip rotational state that is scheduled in the slip control of the lock-up clutch 3 deteriorates. In contrast, by suppressing load fluctuations of engine accessories such as an air conditioner compressor 23 and an alternator 24 during slip control of the lock-up clutch 3, fluctuations in the engine torque that is input to the lock-up clutch 3 is suppressed. Accordingly, the lock-up capacity and the input torque in the lock-up clutch 3 are kept in a relationship that maintains the predetermined slip rotational state, even if there is a load fluctuation request of the engine accessories during slip control. As a result, it is possible to prevent a slip rotational state from deteriorating as a result of load fluctuations of engine accessories such as an air conditioner compressor 23 and an alternator 24 during slip control of the lock-up clutch 3, and to achieve the objective of the slip control.

In the first embodiment, when slip control of the lock-up clutch 3 is in progress is when LU engagement is in progress, during which the lock-up clutch 3 is shifted from a released state to an engaged state by using a control to increase the lock-up capacity of the lock-up clutch 3. Therefore, it is possible to solve the following problems that occur during LU engagement (release→engagement).

Increase in Accessory Load During LU Engagement

→A decrease in the slip rotational speed caused by an increase in the engine brake force due to accessory load will be generated in addition to a decrease in the slip rotational speed caused by a lock-up capacity control for reducing the slip rotational speed. Consequently, the decrease in the slip rotational speed becomes faster than in a normal state (when there is no accessory load fluctuation), thus creating a risk that the lock-up clutch 3 is suddenly engaged, to generate lock-up engagement shock.

Decrease in Accessory Load During LU Engagement

→As the engine torque that was used for driving the accessories is returned, the engine is thrust (the engine rotational speed is increased by the corresponding returned amount of engine torque), the reduced slip rotational speed switches to an increase, and there is the risk that shock due to longitudinal G fluctuation will occur at that time (FIG. 4).

In the first embodiment, when slip control of the lock-up clutch 3 is in progress is when LU release is in progress, during which the lock-up clutch 3 is shifted from an engaged state to a released state by using a control to decrease the lock-up capacity of the lock-up clutch 3.

Therefore, it is possible to solve the following problems that occur during LU release (engagement→release).

Increase in Accessory Load During LU Release

→When the slip rotational speed of the lock-up clutch is increased, increase in the engine rotational speed is suppressed due to an increase in the accessory load, and an increase in the slip rotational speed is delayed. Consequently, it takes time to bring the lock-up clutch into a released state.

Decrease in Accessory Load During LU Release

→An increase in the slip rotational speed caused by a decrease in the engine brake force due to accessory load will be generated in addition to an increase in the slip rotational speed caused by a lock-up capacity control for increasing the slip rotational speed. Consequently, the increase in the slip rotational speed becomes faster than in a normal state, thus creating a risk that the lock-up clutch is suddenly released, to generate lock-up release shock.

In the first embodiment, when slip control of the lock-up clutch 3 is in progress is when a coasting capacity learning control is in progress, whereby, when experiencing traveling by coasting, a learning value update differential rotation is generated by using a control to reduce the LU hydraulic pressure command, to obtain the learning value of the lock-up capacity during coasting.

Therefore, it is possible to solve the following problems that occur during coasting capacity learning control.

Increase in Accessory Load During Coasting Capacity Learning Control

→The engine break force by using the accessory load increases; thereby, the engine rotation cannot be supported by the transmission of the rotation of the drive wheels by a slip, thus reducing the engine rotational speed, and an LU deviation occurs in which the slip rotational speed increases. In this case, the lock-up capacity of when LU deviation occurs will be learned, so an erroneous lock-up capacity will be learned (FIG. 7).

Decrease in Accessory Load During Coasting Capacity Learning Control

→The engine brake force decreases; thereby, decrease in the engine rotational speed is delayed and an increase in the slip rotational speed is delayed, requiring more time to learn the capacity.

In the first embodiment, when slip control of the lock-up clutch 3 is in progress is when a coast LU slip control is in progress, in which, during coasting with the lock-up clutch 3 in an engaged state, upon shifting to a released state by using a control to reduce the lock-up differential pressure, the vehicle shifts to a slip rotational state by generation of a differential rotation. Therefore, it is possible to solve the following problems that occur during coast LU slip control.

Increase in Accessory Load During Coast LU Slip Control

→The engine break force increases during a coast LU slip control; thereby, the engine rotation cannot be supported by the transmission of the rotation of the drive wheels by a slip, thus reducing the engine rotational speed, and an LU deviation occurs in which the slip rotational speed increases. In this manner, a reduction in the rotational speed of the engine is accelerated, and it becomes necessary to correspondingly restart fuel injection soon.

Decrease in Accessory Load During Coast LU Slip Control

→The engine brake force decreases during the coast LU slip control, and the slip rotational speed is thereby reduced. When there is a sudden braking in a state in which the slip rotational speed is reduced, the lock-up clutch cannot be released on time, and there is the risk that engine stall occurs (FIG. 8).

In the first embodiment, in the event the engine accessory is an air conditioner compressor 23, in which the load fluctuates between two values of ON/OFF, when there is a request to switch the air conditioner compressor 23 during slip control of the lock-up clutch 3 the switching operation of the air conditioner compressor 23 is delayed (FIG. 2). That is, in the air conditioner compressor 23, a control is carried out to repeat driving/stopping by switching between ON and OFF during AC operation. Then, the accessory load that the engine 1 receives due to the driving/stopping fluctuates in an ON/OFF manner, such as the engine load being high when the air conditioner compressor 23 is driven and low when the air conditioner compressor 23 is stopped. In contrast, when the engine accessory is an air conditioner compressor 23, by delaying the switching operation during a slip control it is possible to prevent fluctuations in the engine torque caused by fluctuations in the ON/OFF accessory load.

In the first embodiment, in the event the engine accessory is an alternator 24 in which the load fluctuates depending on the magnitude of the load value, when there is a request to change the load value of the alternator 24 during a slip control of the lock-up clutch 3 in a cooperative control a limit is imparted to the changes in the load value of the alternator 24 (FIG. 3). That is, during regeneration, the alternator 24 carries out a regenerative control in which the magnitude of the regenerative torque is caused to fluctuate as the requested regeneration amount is changed. The magnitude of this regenerative torque is the magnitude of the load value for the engine 1; if the magnitude of the regenerative torque changes, the accessory load received by the engine 1 will increase and decrease according to changes in the load value. In contrast, if the engine accessory is an alternator 24, by limiting changes in the load value during a slip control it is possible to suppress fluctuations in the engine torque caused by accessory load fluctuations that change the load value.

Next, the effects are described. The effects listed below can be obtained by using the lock-up control method and control device of an engine-equipped vehicle according to the first embodiment.

(1) The vehicle (engine-equipped vehicle) comprises a torque converter 4 that has a lock-up clutch 3 and that is arranged between an engine 1 and a transmission (the continuously variable transmission 6), and engine accessories (the air conditioner compressor 23, the alternator 24) that are driven by the engine 1, wherein slip control is executed that produces a predetermined slip rotational state by controlling a lock-up capacity of the lock-up clutch 3, and during the slip control of the lock-up clutch 3, cooperative control is executed that suppresses load fluctuations of engine accessories (the air conditioner compressor 23, the alternator 24) (FIG. 1 to FIG. 3). As a result, it is possible to provide a vehicle (engine-equipped vehicle) lock-up control method that prevents deterioration of the slip state of the lock-up clutch 3, even when there is a load fluctuation request of engine accessories (air conditioner compressor 23, alternator 24) during a slip control of the lock-up clutch 3.

(2) During the slip control of the lock-up clutch 3 while conducting lock-up engagement (during the LU engagement), the lock-up clutch capacity of the lock-up clutch 3 is controlled to increase as the lock-up clutch 3 transitions from a released state to an engaged state (FIG. 5). As a result, in addition to the effect of (1), in the event the accessory load increases during lock-up engagement (during the LU engagement), it is possible to prevent occurrence of lock-up engagement shock caused by a sudden engagement of the lock-up clutch 3. Furthermore, in the event the accessory load decreases during lock-up engagement (during the LU engagement), it is possible to prevent occurrence of shock caused by fluctuations in longitudinal G.

(3) During the slip control of the lock-up clutch 3 while conducting lock-up release (during the LU release), the lock-up clutch capacity of the lock-up clutch 3 is controlled to decrease as lock-up clutch 3 transitions from an engaged state to a released state (FIG. 2). As a result, in addition to the effect of (1) or (2), in the event the accessory load increases during lock-up release (during the LU release), it is possible to shorten the time until the lock-up clutch 3 is brought into a released state. Furthermore, in the event the accessory load decreases during lock-up release (during the LU release), it is possible to prevent an occurrence of lock-up release shock.

(4) During the slip control of the lock-up clutch 3 when experiencing coasting while traveling, a coasting capacity learning control is executed that reduces a lock-up hydraulic pressure command (the LU hydraulic pressure command) to generate a learning value update differential rotation and to acquire a learning value of the lock-up capacity of the lock-up clutch 3 during the coasting. (FIG. 6). Accordingly, in addition to the effects of (1) to (3), in the event the accessory load increases during a coasting capacity learning control, it is possible to prevent lock-up deviation (the LU deviation) and to prevent an erroneous learning of the lock-up capacity. Furthermore, in the event the accessory load decreases during a coasting capacity learning control, it is possible to shorten the time required for coasting capacity learning.

(5) During the slip control of the lock-up clutch 3 while coasting with the lock-up clutch 3 is engaged, a coast lock-up slip control (the coast LU slip control) is executed that shifts the lockup clutch 3 to a slip rotational state by generation of a differential rotation and that reduces a lock-up differential pressure (the LU differential pressure) to shift to a released state (FIG. 9). Accordingly, in addition to the effects of (1) to (4), in the event the accessory load increases during a coast lock-up slip control (the coast LU slip control), it is possible to prevent lock-up deviation (the LU deviation) and to prevent an early restart of fuel injection. Furthermore, in the event the accessory load decreases during a coast lock-up slip control (the coast LU slip control), it is possible to prevent an occurrence of engine stall caused by an intervention of sudden braking.

(6) The cooperative control delays a switching operation of the engine accessories accessory (the air conditioner compressor 23) whose load fluctuates between two values of on and off in response to a request to switch the engine accessory (the air conditioner compressor 23) during the slip control of the lock-up clutch 3 (FIG. 2, S4, S9). Accordingly, in addition to the effects of (1) to (5), in the event the engine accessory is an accessory (the air conditioner compressor 23) in which the load fluctuates between two values of ON/OFF, it is possible to prevent fluctuations in the engine torque caused by fluctuations in the ON/OFF accessory load.

(7) The cooperative control limits a change in a load value of the engine accessory (the alternator 24) whose load fluctuates depending on a magnitude of the load value in response to a request to change the load value of the engine accessory (the alternator 24) during the slip control of the lock-up clutch 3 (FIG. 3, S24). Accordingly, in addition to the effects of (1) to (5), in the event the engine accessory is an accessory (the alternator 24) in which the load fluctuates depending on the magnitude of the load value, it is possible to prevent fluctuations in the engine torque caused by fluctuations in the accessory load that change the load value.

(8) The vehicle (the engine-equipped vehicle) comprises a torque converter 3 that has a lock-up clutch 4 and that is arranged between an engine 1 and a transmission (the continuously variable transmission 6), and an engine accessory (the air conditioner compressor 23, the alternator 24) that are driven by the engine 1, wherein a slip control unit (the CVT control unit 12) executes out slip control to produce a predetermined slip rotational state by controlling a lock-up capacity of the lock-up clutch 3, an engine accessory load control unit (the AC control unit 31, the ALT control unit 32) executes out an engine accessory load control according to a load fluctuation request to the engine accessories (the air conditioner compressor 23, the alternator 24), and a cooperative control unit (the CVT control unit 12: FIGS. 1-3) executes a cooperative control process that suppresses load fluctuations of the engine accessory (the air conditioner compressor 23, the alternator 24) during slip control of the lock-up clutch 3. As a result, it is possible to provide a vehicle (the engine-equipped vehicle) lock-up control device that prevents deterioration of the slip state of the lock-up clutch 3, even when there is a load fluctuation request of engine accessories (the air conditioner compressor 23, the alternator 24) during a slip control of the lock-up clutch 3.

The vehicle lock-up control method and control device of the present invention were described above based on the first embodiment, but specific configurations thereof are not limited to this first embodiment, and various modifications and additions to the design can be made without departing from the scope of the invention according to each claim in the Claims.

In the first embodiment, an example was shown in which a representative air conditioner compressor 23 and an alternator 24 are used as engine accessories. However, engine accessories may include other accessories that are driven by the engine such as a circulation pump, in addition to an air conditioner compressor and an alternator.

In the first embodiment, an example was shown in which the slip control of the lock-up clutch, when in a driving state with the accelerator depressed, is an initial-motion slip control, in which a lock-up clutch that is in the released state at the time of start is shifted to an engaged state through slip engagement. However, the slip control of the lock-up clutch in the driving state may be an example of a slip control during traveling in which a lock-up engagement request is issued when the vehicle speed becomes equal to or greater than a predetermined vehicle speed, and a process to engage the lock-up clutch is started. Additionally, it may be an example of a slip control during traveling in which a lock-up release request is issued when the vehicle speed becomes equal to or less than a predetermined vehicle speed, and a process to release the lock-up clutch is started.

In the first embodiment, an example was shown in which the lock-up control method and control device of the present invention are applied to an engine-equipped vehicle equipped with a torque converter and a continuously variable transmission. However, the lock-up clutch control device of the present invention may be applied to a hybrid vehicle, and the transmission may be a stepped transmission that carries out stepped automatic shifting, as long as the vehicle is equipped with an engine as a drive source. In short, the lock-up clutch control device may be applied to any vehicle provided with a torque converter comprising a lock-up clutch between the engine and the transmission.

The invention claimed is:

1. A vehicle lock-up control method for a vehicle having a torque converter with a lock-up clutch that is arranged between an engine and a transmission, and an engine accessory to be driven by the engine, the vehicle lock-up control method comprising:
   executing slip control that produces a predetermined slip rotational state by controlling a lock-up capacity of the lock-up clutch; and
   during the slip control of the lock-up clutch, executing cooperative control that suppresses load fluctuations of the engine accessory,
   during the slip control of the lock-up clutch while conducting lock-up release, the lock-up clutch capacity of the lock-up clutch is controlled to decrease as the lock-up clutch transitions from an engaged state to a released state, and
   the cooperative control delays a switching operation of the engine accessory whose load fluctuates between two values of on and off in response to a request to switch the engine accessory during the slip control of the lock-up clutch.

2. The vehicle lock-up control method according to claim 1, wherein
   during the slip control of the lock-up clutch while conducting lock-up engagement, the lock-up clutch capacity of the lock-up clutch is controlled to increase as the lock-up clutch transitions from a released state to an engaged state.

3. The vehicle lock-up control method according to claim 1, wherein
   during the slip control of the lockup clutch, when experiencing coasting while traveling, a coasting capacity learning control is executed that reduces a lock-up hydraulic pressure command to generate a learning value update differential rotation and to acquire a learning value of the lock-up capacity of the lock-up clutch during the coasting.

4. The vehicle lock-up control method according to claim 1, wherein
   during the slip control of the lockup clutch while coasting with the lock-up clutch is engaged, a coast lock-up slip control is executed that shifts the lockup clutch to a slip rotational state by generation of a differential rotation and that reduces a lock-up differential pressure to shift to a released state.

* * * * *